Figure 1:

United States Patent [19]

Bönnemann et al.

[11] Patent Number: 5,053,075

[45] Date of Patent: Oct. 1, 1991

[54] ACICULAR IRON-MAGNET PIGMENTS HAVING AN ADJUSTABLE COERCIVE FIELD STRENGTH AND PROCESS FOR PRODUCING SAME

[75] Inventors: Helmut Bönnemann; Werner Brijoux; Rainer Brinkmann, all of Müheim an der Ruhr, Fed. Rep. of Germany

[73] Assignee: Studiengesellschaft Kohle mbH, Mülheim an der Ruhr, Fed. Rep. of Germany

[21] Appl. No.: 463,764

[22] Filed: Jan. 12, 1990

[30] Foreign Application Priority Data

Jan. 14, 1989 [DE] Fed. Rep. of Germany ....... 3901027

[51] Int. Cl.$^5$ .......................... C21C 15/00; B22F 9/00
[52] U.S. Cl. ........................................ 75/348; 75/343
[58] Field of Search .................................. 75/343–348

[56] References Cited

U.S. PATENT DOCUMENTS

| | | | |
|---|---|---|---|
| 3,532,490 | 10/1970 | Burkin | 75/344 |
| 3,623,859 | 11/1971 | Aldridge | 75/343 |
| 4,378,240 | 3/1983 | Siegle | 75/348 |

*Primary Examiner*—Peter D. Rosenberg
*Attorney, Agent, or Firm*—Sprung, Horn, Kramer & Woods

[57] ABSTRACT

Disclosed is a process for preparing acicular non-sintered iron metal pigments for magnetic signal recording, having a high storage density, high saturation magnetization and remanence, the coercive field strength of which at a given crystallite size of the starting material is low and is increased as desired by subsequent annealing. The preparation of said iron metal pigments is effected by reduction of iron oxide compounds with metal hydrides of metals of the Groups I or II of the Periodic Table of Elements in organic solvents, with the metal hydrides being solvatized with a carrier in the form of a carrier complex.

8 Claims, 1 Drawing Sheet

ACICULAR IRON-MAGNET PIGMENTS HAVING AN ADJUSTABLE COERCIVE FIELD STRENGTH AND PROCESS FOR PRODUCING SAME

The present invention relates to novel ferromagnetic metal pigments of high storage density, superior saturation magnetization $M_S$ and high remanence $M_R$ for magnetic recording purposes which substantially consist of iron and are distinguished as well-shaped acicular particles having superior properties as recording carriers in that the coercive field strength $H_C$ is adjustable by means of a thermal after-treatment in a manner so far not described, and to a process of producing such materials.

Several processes for the production of magnetic metal pigments have been described in the literature. Besides the electrolytic deposition from salt solutions of metal powders (U.S. Pat. No. 2,974,104 and U.S. Pat. No. 2,988,466) and the thermal decomposition of appropriate metal carbonyls (U.S. Pat. No. 2 597,701 and British Patent Specification 695,925), suitable metal powders are further prepared from aqueous solutions of the metal ions by way of reduction using reducing agents also present in the dissolved state. To produce anisometric particles, the operation is carried out, if desired, in a magnetic field (U.S. Pat. No. 3,206,338 and U.S. Pat. No. 3,607,218). However, hereupon, the metal powder obtained is contaminated with inorganic by-products which must be removed in a particular technically expensive multi-step process with water and water-miscible solvents.

The preparation of iron powders from the corresponding oxides, oxide hydroxides etc. by the reduction with gaseous reducing agents (usually hydrogen) at temperatures in excess of 250° C. has also been described (U.S. Pat. No. 2,879,154 and U.S. Pat. No. 2,900,246). This procedure has been optimized in that an iron(III) hydroxide as a precursor has been converted into a ferrimagnetic iron oxide ($Fe_2O_3$), reduced with a gaseous reducing agent at temperatures between 300° C. and 600° C., and especially from 400°–500° C., to form $Fe_3O_4$, which latter material has been annealed at 600°–800° C. (European Patent Specification No. 0 015 485).

The crucial characteristics of magnetic materials for recording purposes are saturation magnetization $M_S$, remanence $M_R$ and coercive field strength $H_C$. The development of new magnet pigments aims to improve the storage densities by increasing the remanence and coercive force. According to prior art, said magnetic properties have been optimized only via the particle size and shape of the iron oxide and/or hydroxide starting compounds, respectively. Upon variation of the particle size and shape, particularly finely divided Fe-oxide starting compounds produce Fe metal pigments which always exhibit maximum values for the coercive field strength in addition to high storage density, saturation magnetization and remanence. In the course thereof, iron magnet pigments are formed which have a saturation magnetization, e.g., $M_S$ of 188 [mT cm$^3$/g], a remanence $M_R$ of about 115 [mT cm$^3$/g], and a coercive field strength $H_C$ of 98.6 [kA/m] (European Patent Specification 0 015 485). The magnetic properties of products, due to the nature thereof, from high temperature-gas phase-reduction processes cannot be influenced any more by a thermal after-treatment.

However, in practice an adjustment of certain coercive force ranges of the magnet pigment to be used is desirable. Thus, e.g., video home system recorders require $H_C$ values of up to 50 kA/m, super VHS devices operate at about 60 kA/m, while other applications such as video-8 camera recording and digital audio-tape or recent data recording devices in the computer field demand highly coercive materials having $H_C$ values of above 100 kA/m.

It is the object of the invention, by deoxygenation of finely divided acicular iron oxides, to prepare acicular iron metal pigments which exhibit high values of the saturation magnetization $M_S$ of greater than 160 mT.cm$^3$/g and of the remanence $M_R$ of greater than 80 mT.cm$^3$/g, the coercive force $H_C$ of which can be adjusted to between 35 and 125 kA/m for the above-mentioned sectors of application.

Now it was surprisingly found that finely divided acicular iron oxides—optionally provided with additives—are capable of undergoing a smooth reaction with $H_2$ at from 1 to 200 bar under organic solvents at temperatures of already between 20° C. and 150° C. to form iron metal pigments, if metal hydrides of the first and/or second main groups of the Periodic Table of Elements (PSE) are added, which metal hydrides, for solvatization in organic phase, have been complexed to a carrier of the general formula $BR_3$ or $BR_n(OR')_{3-n}$ (R, R' = alkyl, aryl, aralkyl; n=0, 1, 2). As a soluble hydride carrier complex there may also be used a $NR''_4[BR_n(OR')_{3-n}H]$ or $NR''_4[BR_3H]$, which is accessible from the respective carrier complexes $MH_x.(BR_3)_x$ or $MH_x.[BR_n(OR')_{3-n}]_x$ and ammonium salts $NR''_4Y$, with Y being an anion and M being a metal of the first or second main groups of the PSE. During the reaction with $H_2$ of the iron oxides etc. employed, the complexed hydrides are converted into metal or ammonium oxygen compounds of the type $M(OH)_x.(BR_3)_x$ or $M(OH)_x.[BR_n(OR')_{3-n}]_x$ (x=1, 2). The reaction is preferably carried out with stirring in the course of from 1 to 100 hours, especially in the course of from 4 to 16 hours. Since the oxygen-containing reaction products of the hydrides, due to complex formation with the carrier, remain in solution, upon completion of the reaction the Fe metal pigment may be isolated in the pure state by way of a simple filtration from the clear organic solution.

A process which is capable of reducing those starting compounds wherein iron has been bound to oxygen below the deoxygenation temperature in the gaseous state process $H_2 + Fe$ oxides has so far not been known.

In the present invention, with the abbreviations R, $R^1$ and $R^2$, the alkyl group is always a $C_1$ to $C_6$ alkyl group. The aryl group within the scope of the present invention is always intended to denote a phenyl group. The aralkyl group within the scope of the present invention is always intended to denote a phenyl $C_1$–$C_6$ alkyl group. The trialkylsilyl group within the scope of the present invention is always intended to denote a tri-$C_1$–$C_6$ alkylsilyl group.

Furthermore, it was surprisingly found that from an iron oxide of an equal crystallite size (about 16 nm) products are obtained which have a high-saturation magnetization and remanence (such as technically desired), however a low coercive force (about 40 kA/m). If iron oxides having a higher crystallite size, e.g., of about 24 nm, are initially employed, then Fe pigments are obtained which even have a lower coercive field strength (<38 kA/m) (Table 6, No. 3, 4, 6, 21). However, the $H_C$ value of the pigments produced according to the invention may now be adjusted or increased thermally in vacuo or under a protective gas or inert liquid, respectively. Depending on the duration and temperature employed, the $H_C$ value in Fe magnet pigments prepared according to the invention may be deliberately varied within the required limits between ~35 and 125 kA/m. Preferred is a range of from 50 to 90 kA/m. Such a combination of magnetic values is not obtainable according to prior art. Table 1 summarizes the results of the thermal after-treatments of various Fe magnet pigments prepared according to the invention. In this case, at a pre-determined period of time (4 h), the temperature was varied; however, an adjustment of definite ranges of $H_c$ values may be additionally be attained upon a variation of time.

Table 1

FIG. 1 shows an electron micrograph (magnification 1:200,000) of a Fe magnet pigment produced according to the present invention, which Fe magnet pigment was after-treated at 250° C. under hydrogen for 4 h (Table 1, No. 5). Although, relative to the initial acicular α-FeOOH, upon the reaction forming the metal a volume decrease by about 60% is observed, the needle shape of the oxidic starting compound is retained according to the finding by electron microscopy. As is to be recognized, the after-treatment does not effect and undesirable sintering of the metal needles. In contrast thereto, the $H_C$ value of the Fe magnet pigment increases to 100.4 kA/m due to the thermal after-treatment from 82.2 kA/m in the primary product. Furthermore, the after-treatment causes the surface to become smoothed: Thus, the primary product exhibits a specific surface area of 36.1 m$^2$/g; subsequently to the thermal after-treatment, the measured specific surface area was 23.0 m$^2$/g (see Table 2, No. 1).

Table 2

The thermal after-treatment may be carried out in an atmosphere of a protective gas (e.g. H$_2$, Ar), under vacuum or under organic solvents. As is evident from Table 2, the result of the thermal after-treatment is independent of the selected medium. The Fe metal pigments produced according to the invention may of course be subjected to further after-treatments, e.g. for the purpose of stabilizing against oxidation and/or for influencing the dispersing properties thereof.

Furthermore, subject matter of the present invention is a process for producing the metal powders according to the invention, which process for the first time allows to react anisometric FeOOH or Fe$_2$O$_3$ starting compounds of varying crystallite size far below the deoxygenation temperature in the gas phase process H$_2$+Fe oxide in organic phase to form acicular Fe magnet pigment which combine a high degree of deoxygenation, a high saturation magnetization and remanence with a comparatively low coercive field strength. Further claimed is a process for the thermal after-treatment of the primary products for increasing or adjusting the $H_C$ value to ranges as required in view of the operating points of certain types of devices.

While according to prior art a step for dehydrating α-FeOOH to form α-Fe$_2$O$_3$ is first carried out, in the process according to the invention FeOOH may be reacted to form the metal pigment in one step, whereby the needle shape of the starting compound will not be destroyed. The Fe magnet pigments prepared according to the invention have a high degree of deoxygenation, as is furnished evidence of by the saturation magnetization measured of $M_S > 160$ mT cm$^3$/g. Other than the products obtained from the high temperature process (prior art), the acicular Fe metal pigments prepared according to the invention do not exhibit any sintering (FIG. 1).

FIG. 1

The metal hydride carrier complexes employed according to the invention are obtained by known processes {Liebigs Ann. Chemie 717 (1968) 21} by the reaction of alkali metal and alkaline earth metal hydrides with organic compounds of the triply coordinated boron of the types BR$_3$ or BR$_n$(OR')$_{3-n}$, respectively (R, R'=alkyl, aryl, aralkyl; n=0, 1, 2). The process according to the invention may be advantageously carried out also in such a manner that the soluble metal hydride-carrier complex is prepared in situ from metals of the first an/or second groups of the PE, H$_2$ and the organoboron carrier. All kinds of organic solvents, unless they do not themselves react with metal hydrides, are suitable for the process according to the invention, such as, e.g., ethers, aliphatics, aromatics as well as mixtures of various solvents. It is a characteristic of the process carried out according to the invention that the organoboron carrier can be easily regenerated by decomplexing the oxygen-containing by-products. Reactions of α-FeOOH with Na[BEt$_3$H] and H$_2$ in THF or dioxane produced Na[BEt$_3$OH] in solution as shown by the $^{11}$B-NMR spectrum ($^{11}$B signal at 1 ppm). From this -ate complex as present in solution, one recovers the carrier BEt$_3$ by hydrolysis with HCl/THF in 97% yield, according to gas chromatography analysis. Corresponding results are obtained with ether/hydrocarbon mixtures. High regeneration rates of re-usable carrier are preferably obtained if the feed solution contains at least one to two moles of an n-donor, e.g. ether, as stabilizer per one mole of hydride/carrier complex. In neat hydrocarbons, i.e. in the absence of a stabilizing electron donor (e.g. ether), the resulting -ate complex, e.g. Na[BEt$_3$OH], decays to form a metal oxyborane, e.g. NaOBEt$_2$. After the removal of the magnet pigment powders, this material may be treated in the reaction solution with organometal alkylating agents and may be recovered, e.g. in the form of tri-organo-borane.

What is further claimed is a process for the thermal after-treatment of the Fe metal pigments prepared according to the invention from oxidic starting compounds of variable crystallite sizes in order to increase or adjust, respectively, the coercive field strength $H_C$ to between about 50 and 125 kA/m, preferably to from 35 to 90 kA/m. The thermal after-treatment may be carried out under vacuum, under a protective gas such as a rare gas and/or, for example, H$_2$ as well as under inert organic liquid such as decalin. At a fixed duration of the experiment, the resulting $H_C$ value increases with increasing temperature. By using different temperatures for the after-treatment, definite $H_C$ value ranges may be deliberately adjusted from one and the same primary product. Alternatively, the $H_C$ value adjustment may be successfully accomplished by the variation of the time of the experiment. As is shown by electron-microscopical examinations (cf. FIG. 1), no undesired sintering of the metal needles occurs during the after-treatment. Another positive effect of the thermal after-treatment consists of that the surface is smoothed. Thus, the primary product prepared according to the invention (Table 2, No. 1) exhibits a specific BET surface area of 36.1 m²/g; subsequently to the after-treatment, a value of 23.0 m²/g was measured. The smoothing of the surface facilitates further processing the Fe magnet pigments to magnetic tapes, plates, floppy disks, magnetic cards etc.

The metal pigments according to the invention are used for the production of magnetogram carriers for magnetic information processing. Tapes based on said pigments exhibit excellent magnetic data (remanence on the tape>300 mT, and preferably about 350 mT; alignability $M_R/M_S$>0.80). The pure iron pigments according to the invention, because of their $H_C$ values being selectively adjustable depending on the intended use, are advantageously usable in magnetic recording media at all operating points of the audio and video ranges in practice. The materials according to the invention for the first time enable to use pure iron pigments having a high saturation magnetization and remanence in the low-coercive as well as high-coercive range of application.

The invention is further illustrated by way of Example.

Table 3

Example 1

Preparation of Iron Pigment from FeOOH, Na, BEt₃ and H₂ in THF

In a 500 ml autoclave equipped with a stirrer, 3.2 g (36 mmoles) of FeOOH (A 3) under a protective gas are admixed with 4.0 g (174 mmoles) of sodium, 27.9 g (285 mmoles) of triethylborane and 260 ml of THF. H₂ is added at room temperature to a pressure of 100 bar, and the stirred mixture is heated at 80° C. for 16 hours. After cooling to room temperature and blowing the hydrogen off, the black reaction mixture is discharged, and the clear supernatant solution is separated from the iron pigment. The iron is washed with 300 ml of THF, stirred with 250 ml of THF and 50 ml of ethanol until the gas evolution ceases and is washed again with 300 ml of THF. After drying under high vacuum ($10^{-3}$ mbar), 2.2 g of iron pigment are obtained (see Table 4, No. 6).

TABLE 4

| $Fe^{(0)}$: | 71% |
|---|---|
| $Fe_{total}$ | 84.45% |
| $M_S$ | 176 mT cm³/g |
| $M_R$ | 94.4 mT cm³/g |
| $H_C$ | 87.1 kA/m |

Example 2

Preparation of Iron Pigment from Fe₂O₃, Na, BEt₃ and H₂ in toluene

In a 500 ml autoclave equipped with a stirrer, 2.9 g (18 mmoles) of Fe₂O₃ (B 4) under a protective gas are admixed with 4.0 g (174 mmoles) of sodium, 27.4 g (280 mmoles) of triethylborane and 260 ml of toluene. H₂ is added at room temperature to a pressure of 100 bar, and the stirred mixture is heated at 80° C. After cooling to room temperature and blowing the hydrogen off, the black reaction mixture is discharged, and the clear supernatant solution is separated from the iron pigment. The iron is washed with 250 ml of THF, stirred with 250 ml of THF and 50 ml of ethanol until the gas evolution ceases and is washed again with 300 ml of THF. After drying under high vacuum ($10^{-1}$ mbar), 2.4 g of iron pigment are obtained (see Table 5, No. 2).

TABLE 5

| $Fe^{(0)}$: | 73.8% |
|---|---|
| $Fe_{total}$ | 83.4% |
| $M_S$ | 169 mT cm³/g |
| $M_R$ | 82.3 mT cm³/g |
| $H_C$ | 67.1 kA/m |
| BET surface area: | 43.1 m²/g |

Example 3

Preparation of Iron Pigment from FeOOH, Na[BEt₃H) and H₂ in toluene

In a 5 l autoclave equipped with a stirrer, 96 g (1.078 moles) of FeOOH (A 3) under a protective gas are admixed with 1.22 l of a 2.67-molar solution of Na[BEt₃H] in toluene and filled up with toluene to a working volume of 3.0 l. H₂ is added at room temperature to a pressure of 100 bar, and the stirred mixture is heated at 80° C. for 16 hours. After cooling to room temperature, the hydrogen is blown off, and the black reaction mixture is discharged. The clear supernatant solution is separated from the iron pigment, and the iron is washed with 1.5 ml of THF. The residue is stirred with 1.5 ml of THF and 0.4 l of ethanol until the gas evolution ceases and is washed again with 1.5 l of THF; after drying under high vacuum ($10^{-3}$ mbar), 63.7 g of iron pigment are obtained (see Table 6, No. 10).

| $Fe^{(0)}$: | 81.6% |
|---|---|
| $Fe_{total}$ | 87.87% |
| $M_S$ | 193.0 mT cm³/g |
| $M_R$ | 101.3 mT cm³/g |
| $H_C$ | 82.2 kA/m |

Example 4

Preparation of Iron Pigment from FeOOH, Na[BEt₃H] and H₂ in THF

In a 500 ml autoclave equipped with a stirrer, 3.2 g (36 mmoles) of FeOOH (A 3) under a protective gas are admixed with 61.2 ml of a 1.47-molar (90 mmoles) solution of Na[BEt₃H] in THF and filled up with THF to a working volume of 200 ml. H₂ is added at room temperature to a pressure of 100 bar, and the stirred mixture is heated at 80° C. for 16 hours. After cooling to room temperature and blowing the hydrogen off, the black reaction mixture is discharged, and the clear supernatant solution is separated from the iron pigment. The iron is washed with 300 ml of THF, stirred with 250 ml of THF and 50 ml of ethanol until the gas evolution ceases and is washed again with 300 ml of THF; after drying under high vacuum ($10^{-3}$ mbar), 2.1 g of iron pigment are obtained (see Table 6, No. 14).

TABLE 6

| $Fe^{(0)}$: | 77.6% |
|---|---|
| $Fe_{total}$ | 87.5% |
| $M_S$ | 175.5 mT cm³/g |
| $M_R$ | 86.7 mT cm³/g |
| $H_C$ | 65.3 kA/m |

Example 5

Preparation of Iron Pigment from Fe₂O₃, Na[BEt₃H] and H₂ in toluene

In a 500 ml autoclave equipped with a stirrer, 2.9 g (18 mmoles) of $Fe_2O_3$ (B 1) under a protective gas are admixed with 21.4 g (175 mmoles) of $Na[BEt_3H]$, dissolved in 270 ml of toluene. $H_2$ is added at room temperature to a pressure of 100 bar, and the stirred mixture is heated at 80° C. for 16 hours. After cooling to room temperature, the hydrogen is blown off, and a black reaction mixture is discharged. The iron pigment is separated from the clear supernatant solution, washed with 300 ml of THF, subsequently stirred with 250 ml of THF and 50 ml of ethanol until the gas evolution ceases and is washed again with 300 ml of THF; after drying under high vacuum ($10^{-3}$ mbar), 2.2 g of iron pigment are obtained (see Table 7, No. 5).

TABLE 7

| | |
|---|---|
| $Fe^{(0)}$: | 79.5% |
| $Fe_{total}$ | 88.3% |
| $M_S$ | 204 mT cm³/g |
| $M_R$ | 95 mT cm³/g |
| $H_C$ | 70.4 kA/m |
| BET surface area: | 23.2 m²/g |

Example 6

Preparation of NBu₄[BEt₃H]

545.6 g (1.66 moles) of tetrabutylammonium tetrafluoroborate, dissolved in 1250 ml of THF, while stirred are admixed with stirring at room temperature for 3½ hours with 679 ml of a 2.455-molar (1.66 moles) solution of $Na[BEt_3H]$ in THF, whereupon white $NaBF_4$ is immediately precipitated. After allowing for one more hour, the precipitated $NaBF_4$ is filtered off over a D4 glass frit (171.87 g=1.56 moles), the clear filtrate is concentrated under high vacuum ($10^{-3}$ mbar) to dryness, and 580.8 g of tetrabutylammonium triethylhydroborate are obtained as a white viscous mass.

Hydride determination with 1N hydrochloric acid 2.36 g (6.92 mmoles) of borate yield 153.4 ml $H_2$ (STP)=6.85 mmoles=97.8% of hydride content.

¹¹B-NMR spectrum (THF): δ=12.4 ppm (s).

Preparation of Iron Pigment from FeOOH, NBu₄[BEt₃H] and H₂ in THF 20.6 g (90 mmoles) of the borate thus obtained are reacted with 1.6 g (18 mmoles) of FeOOH (A 3) in 200 ml of THF in the same manner as in Example 4 at 40° C. for 64 hours. The results of the reaction cf. Table 6, Experiment No. 32.

Example 7

Adjustment of the Coercive Field Force $H_C$ by Thermal After-Treatment.

Samples of 5 g each of an iron pigment, obtained from experiment No. 22, Table 6, which has the initial values of $M_S$=175 mT cm³/g, $M_R$=75 mT cm³/g and $H_C$=44.1 kA/m, were heated on a sand bath in a glass vessel bearing a thermosensor under an atmosphere of $H_2$ for 4 h each at temperatures of 200° C., 250° C. and 300° C., respectively. The resulting coercive field forces $H_C$ have been set forth in Table 1 No. 8.

Example 8

Regeneration of the Carrier Triethylborane

To the clear reaction solution separated from the iron pigment of Example 4 there are dropwise added under protective gas and stirring 27 ml of a 3.5-molar (94.5 mmoles) solution of HCl in THF within 20 minutes, whereby after foaming for a short time and slight evolution of heat a white precipitate is formed (NaCl). The reaction mixture is neutralized with $Na_2CO_3$ and filtered over a D3 glass frit. 204.1 g of a clear filtrate are obtained which contains 4.20% (8.57 g=87.5 mmoles) of triethylborane as is shown by analytical gas chromatography. Thus, 97.2% of the carrier triethylborane, based on the carrier complex starting material, are recovered.

Example 9

Regeneration of the Carrier Tripropylborane

The clear reaction solution separated from the iron pigment from No. 12, Table 6, is worked up and analyzed in the same manner as in Example 8. 92.8% of tripropylborane are recovered.

Example 10

Regeneration of the Carrier Triethylborane

The clear reaction solution separated from the iron pigment from No. 22, Table 6, is dropwise added at 170°-180° C. to a solution of 96.1 g (843 mmoles) of triethylaluminum in 250 ml of decalin, whereupon the triethylborane formed directly distils off together with the solvent. 1092.4 g of distillate are obtained which, by analytical gas chromatography, contains 6.18% (67.5 g=688.8 mmoles) of triethylborane. Thus, 81.7% of the carrier, based on the carrier complex employed as the starting material, are recovered.

Example 11

Preparation of CaH₂.(BEt₃)₂

9.0 g (225 moles) of calcium metal (coarsely crystalline) in a 200 ml glass vessel (glass insert for autoclaves with flow breaker and glass beads) under a protective gas are admixed with 51.5 g (525 mmoles) of triethylborane and 75 ml of diglyme, and the vessel is transferred into an autoclave equipped with a stirrer. The pressure container is thermostatized at 90° C., pressurized with 100 bar of $H_2$, and the reaction is started by turning the stirrer on. The experiment is run under isobar conditions, i.e. hydrogen, when used, is re-filled from a pressurized reservoir through a pressure-reducing valve. The pressure drop in the pressurized reservoir is recorded by a recorder. After 40 minutes, about 50% of the amount of $H_2$ have been absorbed, with a short-time temperature rise to 108° C.; the $H_2$ absorption is completed after a total reaction time of 3½ hours. The system is allowed to cool down, the hydrogen is blown off, and a slightly turbid grey reaction mixture is obtained which comprises unreacted calcium metal, which is removed by filtration over a D4 glass frit (1.38 g of Ca recovered=34.5 mmoles); the filtrate is concentrated under high vacuum $10^{-1}$ mbar) at 50° C. For the hydride determination, the highly viscous residue is taken up with THF and filled up with THF to 250 ml; according to protolysis with 1N HCl, a 0.75-molar solution of $CaH_2.(BEt_3)_2$=188.0 mmoles of borate=98.7% [based on reacted calcium (190.5 mmoles)] is obtained.

Preparation of Iron Pigment from FeOOH, CaH$_2$.(BEt$_3$)$_2$ and H$_2$ in THF 220 ml (165 mmoles) of the 0.75-molar solution obtained of CaH$_2$.(BEt$_3$)$_2$ are reacted with 3.2 g (36 mmoles) of FeOOH (A 5) in a 500 ml shaker autoclave under 200 bar of H$_2$ pressure at 74° C. for 72 hours. The results of the reaction are set forth in Table 6, No. 2).

Example 12

Regeneration of the Carrier Triethylborane

The clear reaction solution separated from the iron pigment from experiment No. 21, Table 7, while stirred, is dropwise admixed under a protective gas with distilled water, until gas evolution is not any more to be observed (about 4 to 5 ml). Then, 175.8 g (632 4 mmoles) of solid FeSO$_4$ 7.H$_2$O are added. After 1 to 2 hours of stirring, the bright brown solid is filtered off and subsequently portionwise washed with THF. The clear filtrate (1130.5 g), according to the ($^{11}$B-NMR signal (signal at 86.24 ppm) and analytical gas chromatography, contains 7.17% (81.1 g=827.5 mmoles) of pure triethylborane. Thus, 98.1% of the carrier triethylborane, based on the carrier complex employed as the starting material, are recovered.

TABLE 1

Adjustment of the coercive field force H$_C$ of Fe pigments according to the invention by thermal after-treatment (4 h) at various temperatures

| | Starting material | | M$_S$ | M$_R$ | H$_C$ [kA/m] | | | | | |
|---|---|---|---|---|---|---|---|---|---|---|
| No. | FeOOH | Fe$_2$O$_3$ | [mT cm$^3$g] | [mT cm$^3$g] | untreated | 150° C. | 200° C. | 250° C. | 300° C. | 350° C. |
| 1 | A 3 | | 225.0 | 86.0 | 35.5 | — | 71.4 | 74.0 | 67.4 | 75.7 |
| 2 | A 3 | | 204.6 | 97.3 | 54.6 | — | 83.5 | 90.1 | — | — |
| 3 | A 5 | | 197.6 | 102.1 | 67.0 | — | 81.4 | 84.4 | — | — |
| 4 | A 3 | | 205.9 | 99.3 | 75.4 | — | 100.1 | 108.9 | — | — |
| 5 | A 3 | | 193.0 | 101.3 | 82.2 | 83.0 | 99.8 | 100.4 | 98.2 | — |
| 6 | A 3 | | 209.0 | 103.0 | 65.9 | — | 98.4 | 104.9 | 104.1 | 94.9 |
| 7 | A 7 | | 189.0 | 80.0 | 40.1 | — | 54.1 | 57.6 | 54.2 | — |
| 8 | A 8 | | 175.0 | 75.0 | 44.1 | — | 72.3 | 87.4 | 96.1 | — |
| 9 | A 1 | | 216.0 | 106.0 | 62.3 | 82.1 | 80.8 | 81.9 | 80.9 | 62.7 |
| 10 | A 3 | | 184.0 | 102.0 | — | — | — | 114.2 | — | — |
| 11 | A 3 | | 207.0 | 107.0 | 79.1 | — | — | 121.9 | — | — |
| 12 | | B 3 | 210.0 | 99.0 | 58.8 | — | 75.8 | 78.0 | 77.2 | — |
| 13 | | B 5 | 188.0 | 93.0 | 64.3 | — | 83.0 | 89.4 | 99.0 | — |

TABLE 2

Thermal after-treatment of Fe pigments according to the invention (4 h) under various media

| | Fe pigment (untreated) | | | | H$_2$ protective gas (250° C.) | | | | Ar protective gas (250° C.) | | |
|---|---|---|---|---|---|---|---|---|---|---|---|
| No. | M$_S$ [mT cm$^3$/g] | M$_R$ [mT cm$^3$/g] | H$_C$ [kA/m] | BET [m$^2$g] | BET [m$^2$/g] | M$_S$ [mT cm$^3$/g] | M$_R$ [mT cm$^3$/g] | H$_C$ [kA/m] | M$_S$ [mT cm$^3$/g] | M$_R$ [mT cm$^3$/g] | H$_C$ [kA/m] |
| 1 | 193.0 | 101.3 | 82.2 | 36.1 | 23.0 | 199.0 | 111.6 | 100.4 | 204.0 | 114.0 | 101.6 |
| 2 | 223 | 107 | 57.9 | | | 162.5 | 88.7 | 101.0 | | | |

| | Vacuum (250° C.) | | | Decalin (250° C.) | | |
|---|---|---|---|---|---|---|
| No. | M$_S$ [mT cm$^3$/g] | M$_R$ [mT cm$^3$/g] | H$_C$ [kA/m] | M$_S$ [mT cm$^3$/g] | M$_R$ [mT cm$^3$/g] | H$_C$ [kA/m] |
| 1 | 203.0 | 113.0 | 101.4 | | | |
| 2 | | | | 178.1 | 96.9 | 102.0 |

TABLE 3

| | Employed starting materials | | |
|---|---|---|---|
| Type | Specific surface area BET (m$^2$g) | Crystallite size, (nm) | Symbol |
| FeOOH | 34.3 | — | A 1 |
| FeOOH | 35.6 | — | A 2 |
| FeOOH | 45.4 | 16.0 | A 3 |
| FeOOH | 46.8 | 24.0 | A 4 |
| FeOOH | 59.5 | — | A 5 |
| FeOOH | 85.3 | — | A 6 |
| FeOOH | 107.6 | — | A 7 |
| FeOOH | 138.0 | — | A 8 |
| Fe$_2$O$_3$ | 21.0 | — | B 1 |
| Fe$_2$O$_3$ | 26.9 | — | B 2 |
| Fe$_2$O$_3$ | 35.7 | — | B 3 |
| Fe$_2$O$_3$ | 49.6 | — | B 4 |
| Fe$_2$O$_3$ | 59.9 | — | B 5 |

TABLE 4

Preparation of iron pigments from FeOOH, metal M, carrier and H$_2$ in solvents

| | Starting material | | | | | | | | H$_2$ pressure | T | Time | M$_S$ | M$_R$ | H$_C$ |
|---|---|---|---|---|---|---|---|---|---|---|---|---|---|---|
| No. | Name | [mmol] | M | [mmol] | Carrier | [mmol] | Solvent | [ml] | [bar] | [°C.] | [h] | [mT cm$^3$/g] | [mT cm$^3$/g] | [kA/m] |
| 1 | A 6 | 18 | Ca | 45 | BEt$_3$ | 140 | Diglyme | 130 | 100 | 75 | 96 | — | — | — |
| 2 | A 6 | 36 | Li | 180 | BEt$_3$ | 280 | THF | 260 | 100 | 75 | 65 | — | — | — |
| 3 | A 6 | 36 | K/Na | 180 | BEt$_3$ | 280 | THF | 260 | 100 | 75 | 4 | — | — | — |
| 4 | A 6 | 36 | K | 180 | BEt$_3$ | 280 | THF | 260 | 100 | 75 | 4 | — | — | — |
| 5 | A 6 | 36 | Na | 174 | BEt$_3$ | 280 | THF | 260 | 100 | 75 | 4 | 154 | 51.1 | 38 |
| 6 | A 3 | 36 | Na | 174 | BEt$_3$ | 285 | THF | 260 | 100 | 80 | 16 | 176 | 94.4 | 87.1 |
| 7 | A 3 | 36 | Na | 174 | BEt$_3$ | 282 | THF | 260 | 40 | 50 | 20 | 129.7 | 60 | 86 |
| 8 | A 3 | 36 | Na | 90 | BEt$_3$ | 90 | THF | 137 | 100 | 80 | 16 | 193 | 80 | 51.1 |

TABLE 5

Preparation of iron pigments from $Fe_2O_3$, metal M, carrier and $H_2$ in solvents

| No. | Starting material Name | [mmol] | M | [mmol] | Carrier | [mmol] | Solvent | [ml] | $H_2$ pressure [bar] | T [°C.] | Time [h] | $M_S$ [mT cm³/g] | $M_R$ [mT cm³/g] | $H_C$ [kA/m] |
|---|---|---|---|---|---|---|---|---|---|---|---|---|---|---|
| 1 | B 2 | 18 | Na | 174 | $BEt_3$ | 285 | THF | 260 | 100 | 75 | 4 | 140.6 | 52 | 96 |
| 2 | B 4 | 18 | Na | 174 | $BEt_3$ | 280 | Toluene | 260 | 100 | 80 | 16 | 169 | 82.3 | 67.1 |
| 3 | B 4 | 18 | Na | 174 | $BEt_3$ | 280 | Toluene | 260 | 100 | 115 | 16 | 169 | 78.6 | 51.2 |
| 4 | B 3 | 18 | Na | 174 | $BEt_3$ | 280 | THF | 260 | 100 | 80 | 16 | 206 | 95 | 53.2 |
| 5 | B 5 | 18 | Na | 174 | $BEt_3$ | 280 | THF | 260 | 100 | 80 | 16 | 195 | 82 | 55.8 |
| 6 | B 1 | 18 | Na | 174 | $BEt_3$ | 280 | THF | 260 | 100 | 80 | 16 | 206 | 92.3 | 53.8 |
| 7 | B 1 | 36 | Na | 348 | $BEt_3$ | 560 | THF | 520 | 200 | 80 | 16 | 204 | 97.3 | 59.5 |
| 8 | B 4 | 18 | Na | 172 | $BEt_3$ | 280 | THF | 260 | 100 | 115 | 16 | 186 | 89 | 58.1 |
| 9 | B 1 | 18 | Na | 72 | $BEt_3$ | 72 | THF | 139 | 100 | 80 | 16 | 177 | 76 | 44.7 |

TABLE 6

Preparation of iron pigments from FeOOH, borates and $H_2$ in solvents

| No. | Starting material Name | [mmol] | Carrier complex | [mmol] | Solvent | $H_2$ pressure [bar] | T [°C.] | Time [h] | $M_S$ [mT cm³/g] | $M_R$ [mT cm³/g] | $H_C$ [kA/m] |
|---|---|---|---|---|---|---|---|---|---|---|---|
| 1 | A 5 | 36 | $Ca[(BEt_3H)_2]$ | 165 | THF | 200 | 75 | 47 | — | 40.1 | 47.0 |
| 2 | A 5 | 36 | $Ca[(BEt_3H)_2]$ | 165 | THF | 200 | 74 | 72 | 73.5 | 40.1 | 47.3 |
| 3 | A 4 | 36 | $Na[BEt_3]H$ | 174 | THF | 50 | 80 | 2.5 | 212 | 85.4 | 33.3 |
| 4 | A 4 | 36 | $Na[BEt_3]H$ | 176 | THF | 100 | 80 | 16 | 216 | 82.0 | 37.9 |
| 5 | A 3 | 36 | $Na[BEt_3]H$ | 176 | THF | 100 | 80 | 16 | 216 | 93.0 | 42.4 |
| 6 | A 4 | 36 | $K[BEt_3H]$ | 176 | THF | 100 | 80 | 16 | 210 | 88.0 | 35.0 |
| 7 | A 3 | 36 | $Na[BEt_3H]$ | 176 | Toluene | 100 | 81 | 4 | 220.0 | 97.0 | 69.8 |
| 8 | A 2 | 360 | $Na[BEt_3H]$ | 1760 | Toluene | 100 | 80 | 16 | 197.6 | 102.1 | 67.0 |
| 9 | A 3 | 429 | $Na[BEt_3H]$ | 2146 | Toluene | 100 | 80 | 16 | 205.9 | 99.3 | 75.4 |
| 10 | A 3 | 1078 | $Na[BEt_3H]$ | 3257 | Toluene | 100 | 80 | 16 | 193.0 | 101.3 | 82.2 |
| 11 | A 3 | 1685 | $Na[BEt_3H]$ | 4990 | Toluene | 100 | 80 | 16 | 188.0 | 100.7 | 85.0 |
| 12 | A 3 | 36 | $Na[BPr_3H]$ | 80 | Toluene | 100 | 80 | 10 | — | — | — |
| 13 | A 3 | 432 | $Na[BEt_3H]$ | 2110 | Toluene | 100 | 80 | 16 | 178.1* | 96.9* | 102.0* |
| 14 | A 3 | 36 | $Na[BEt_3H]$ | 90 | THF | 100 | 80 | 16 | 175.5 | 86.7 | 65.3 |
| 15 | A 3 | 36 | $Na[BEt_3H]$ | 90 | Dioxane | 100 | 80 | 16 | — | — | — |
| 16 | A 3 | 337 | $Na[BEt_3H]$ | 848 | THF | 100 | 80 | 16 | 204.6 | 97.3 | 54.6 |
| 17 | A 3 | 2373 | $Na[BEt_3H]$ | 11610 | Toluene | 100 | 80 | 16 | 222.7 | 106.7 | 61.2 |
| 18 | A 2 | 1716 | $Na[BEt_3H]/BEt_3$ | 8584 | Toluene | 100 | 80 | 16 | 202.4 | 109.8 | 83.3 |
| 19 | A 7 | 337 | $Na[BEt_3H]$ | 843 | Toluene | 100 | 80 | 16 | 189 | 80 | 40.1 |
| 20 | A 3 | 337 | $Na[BEt_3H]$ | 843 | Toluene/THF (80:20) | 100 | 80 | 16 | 209 | 103 | 65.9 |
| 21 | A 4 | 337 | $Na[BEt_3H]$ | 843 | THF | 100 | 80 | 16 | 225 | 86 | 35.5 |
| 22 | A 8 | 337 | $Na[BEt_3H]$ | 843 | Toluene | 100 | 80 | 16 | 175 | 75 | 44.1 |
| 23 | A 7 | 1685 | $Na[BEt_3H]$ | 4213 | Toluene | 100 | 80 | 16 | 183* | 103* | 81.4* |
| 24 | A 8 | 1685 | $Na[BEt_3H]$ | 4214 | Toluene | 100 | 80 | 16 | 151* | 83* | 100.5* |
| 25 | A 2 | 36 | $NaH.Et_2B$—OMe | 180 | Toluene | 100 | 80 | 16 | 191 | 90 | 59.9 |
| 26 | A 1 | 1685 | $Na[BEt_3H]$ | 4214 | Toluene | 100 | 80 | 16 | 216 | 106 | 62.3 |
| 27 | A 3 | 1685 | $Na[BEt_3H]$ | 4214 | THF | 100 | 80 | 16 | 184* | 102* | 114.2* |
| 28 | A 3 | 36 | $NaH.Et_2B$—O—$BEt_2$ | 180 | THF | 100 | 80 | 16 | 181 | 89 | 68.4 |
| 29 | A 3 | 36 | $NaH.Et_2BH$ | 180 | Toluene | 100 | 80 | 16 | — | — | — |
| 30 | A 3 | 36 | $Li[BEt_3H]$ | 180 | THF | 100 | 80 | 16 | 114 | 15 | 3.0 |
| 31 | A 3 | 36 | $Na[B(OMe)_3H]$ | 180 | THF | 100 | 80 | 16 | 17 | 5 | 31.2 |
| 32 | A 3 | 18 | $NBu_4[BEt_3H]$ | 90 | THF | 100 | 40 | 64 | 59 | 10 | 21.6 |
| 33 | A 3 | 36 | $Na[BEt_3H]$ | 180 | Toluene | 10 | 80 | 16 | 220 | 91 | 58.0 |
| 34 | A 3 | 36 | $Na[BEt_3H]$ | 180 | Toluene | 100 | 120 | 4 | 210 | 100 | 68.3 |
| 35 | A 3 | 72 | $Na[BEt_3H]$ | 360 | Toluene | 100 | 40 | 16 | 207 | 107 | 79.1 |

*After-treated at 250° C.

TABLE 7

Preparation of iron pigments from $Fe_2O_3$, borates and $H_2$ in solvents

| No. | Starting material Name | [mmol] | Carrier complex | [mmol] | Solvent | $H_2$ pressure [bar] | T [°C.] | Time [h] | $M_S$ [mT cm³/g] | $M_R$ [mT cm³/g] | $H_C$ [kA/m] |
|---|---|---|---|---|---|---|---|---|---|---|---|
| 1 | B 5 | 18 | $K[BEt_3H]$ | 176 | THF | 100 | 80 | 16 | 172 | 85 | 61.7 |
| 2 | B 3 | 18 | $Na[BEt_3H]$ | 176 | Toluene | 100 | 80 | 16 | 197 | 75 | 43.5 |
| 3 | B 5 | 18 | $Na[BEt_3H]$ | 176 | Toluene | 100 | 80 | 16 | 157 | 77 | 70.0 |
| 4 | B 1 | 18 | $Na[BEt_3H]$ | 175 | Toluene | 100 | 80 | 16 | 201 | 94.6 | 74.3 |
| 5 | B 1 | 18 | $Na[BEt_3H]$ | 175 | Toluene | 100 | 80 | 16 | 204 | 95 | 70.4 |
| 6 | B 3 | 168 | $Na[BEt_3H]$ | 674 | Toluene | 100 | 80 | 16 | 210 | 99 | 58.8 |
| 7 | B 5 | 168 | $Na[BEt_3H]$ | 674 | Toluene | 100 | 80 | 16 | 188 | 93 | 64.3 |
| 8 | B 4 | 18 | $Na[BEt_3H]$ | 175 | THF | 100 | 115 | 16 | 169 | 82.6 | 64.1 |
| 9 | B 4 | 18 | $Na[BEt_3H]$ | 175 | Toluene | 100 | 80 | 16 | 182 | 84.1 | 54.6 |
| 10 | B 4 | 18 | $Na[BEt_3H]$ | 175 | Toluene | 100 | 115 | 16 | 166 | 76.8 | 55.8 |
| 11 | B 1 | 18 | $K[B(OMe)_3H]$ | 180 | THF | 100 | 80 | 16 | 195 | 75.0 | 36.1 |
| 12 | B 5 | 1685 | $Na[BEt_3H]$ | 3370 | Toluene | 100 | 80 | 16 | 179* | 97* | 89.7* |
| 13 | B 1 | 36 | $NaH.Et_2B$—OMe | 180 | Toluene | 100 | 80 | 16 | 180 | 76 | 57.0 |
| 14 | B 1 | 18 | $Na[B(OMe)_3H]$ | 180 | THF | 100 | 80 | 16 | 96 | 24 | 12.3 |
| 15 | B 1 | 9 | $NBu_4[BEt_3H]$ | 90 | THF | 100 | 40 | 64 | 17 | 5 | 32.4 |

TABLE 7-continued

| | Preparation of iron pigments from $Fe_2O_3$, borates and $H_2$ in solvents | | | | | | | | | |
|---|---|---|---|---|---|---|---|---|---|---|
| | Starting material | | | | | $H_2$ pressure | T | Time | $M_S$ | $M_R$ | $H_C$ |
| No. | Name | [mmol] | Carrier complex | [mmol] | Solvent | [bar] | [°C.] | [h] | [mT cm³/g] | [mT cm³/g] | [kA/m] |
| 16 | B 1 | 18 | $Na[B(OEt)_3H]$ | 180 | THF | 100 | 80 | 16 | 87 | 29 | 29.5 |

*After-treated at 300° C.

We claim:

1. A process for preparing an acicular iron metal pigment which comprises
   a) solvatizing a metal hydride of the formula $MH_x$ in which
      M is a metal and
      x is 1 or 2,
   in an organic solvent with a regenerable carrier of the formula
      $BR_3$, $BR_n(OR')_{3-n}$, $BROR'H$ or
      $BR_nH_{3-n}$, in which
      R and R' each independently is $C_1$-$C_6$ alkyl or aryl-$C_1$-$C_6$ alkyl, and
      n is 0, 1 or 2,
   to form a complex of the formula
      $MH_x \cdot [BR_3]_x$, $MH_x \cdot [BR_n(OR')_{3-n}]_x$,
      $MH_x \cdot [BROR'H]_x$, $MH_x \cdot [BR_nH_{3-n}]_x$ or
      $NR''_4[BR_n[BR_n(OR')_{3-n}H]$
   in which
      $R''_4$ is $C_1$-$C_6$ alkyl, aryl, aryl-$C_1$-$C_6$ alkyl or tri-$C_1$-$C_6$ alkylsilyl,
   b) reacting a finely divided acicular iron oxide-hydroxide or iron oxide with $H_2$ at from 1 to 200 bar with the metal hydrides produced in (a) in an organic solvent at a temperature from 20° C. to 150° C. and below the deoxygenation temperature in the gas phase process $H_2$+Fe oxides and
   c) separating the resulting pigment from the liquid.

2. The process according to claim 1, wherein the metal hydride $MH_x$ contains a metal M of the first or second groups of the Periodic Table of Elements.

3. The process according to claim 1, wherein the soluble metal hydride-carrier complex is prepared in situ from metals of the first or second groups of the Periodic Table of Elements, $H_2$ and the carrier.

4. The process according to claim 1, wherein the regenerable carrier-metal hydride complex is of the formula $NR''_4[BR_n(OR')_{3-n}H]$ or $NR''_4[BR_3H]$.

5. The process according to claim 1, including the further step (d) of thermally after-treating the pigment obtained in (c) in vacuo or under a protective gas or inert liquid at a temperature from 120° C. to 350° C.

6. The process according to claim 1, including the further step (e) of acidifying the liquid remaining at the end of step (c) thereby to regenerate free $BR_3$ or $BR_n(OR')_{3-n}$.

7. The process according to claim 1, including the further step (f) of treating the liquid remaining at the end of step (c) with an organometal alkylating agent thereby to form a tris-organoborane.

8. The product produced by the process of claim 1.

* * * * *